Oct. 24, 1939.  H. JAMIESON  2,177,489
CONTROL SYSTEM
Filed May 28, 1938
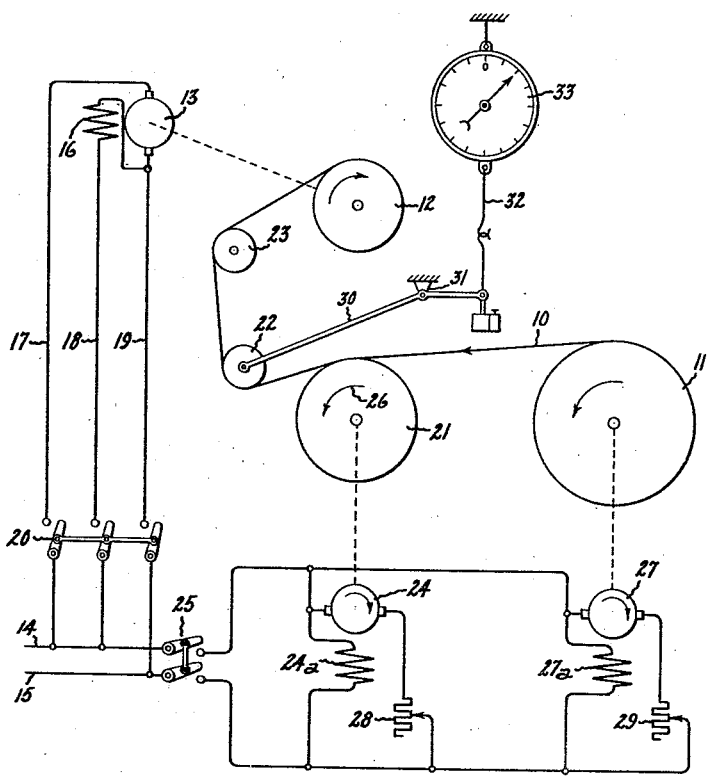
Inventor:
Harold Jamieson,
by Harry E. Dunham
His Attorney.

Patented Oct. 24, 1939

2,177,489

UNITED STATES PATENT OFFICE 2,177,489

CONTROL SYSTEM

Harold Jamieson, Schenectady, N. Y., assignor to General Electric Company, a corporation of New York Application May 28, 1938, Serial No. 210,759

4 Claims. (Cl. 242—45)

The invention relates to control systems, more particularly to control systems for winding and reeling apparatus and the like, and it has for an object the provision of a simple, reliable, inexpensive, and improved system of this character.

More specifically, the invention relates to control systems for winding and reeling apparatus in which a length of material, such for example as wire, is drawn from a supply reel or spool and rewound under tension to form a coil, and a more specific object of the invention is the provision of means for tensioning the material and maintaining the tension substantially constant during the winding operation without using mechanical brakes for this purpose.

In carrying the invention into effect in one form thereof, a capstan drum is interposed between the supply and the winding mechanism. The material is passed about the capstan drum in frictional engagement therewith as it passes to the winding mechanism so that the drum is rotated by the moving material.

An electric torque motor is mechanically connected to the capstan drum and electrically energized so as to produce a torque that opposes the rotation of the drum, thereby to tension the material leaving the drum. A second torque motor is mechanically connected to the supply means and electrically energized to produce a torque opposing the feeding of the material from the supply means, thereby to tension the incoming material to the capstan drum.

In illustrating the invention in one form thereof, it is shown as embodied in a control system for coil winding apparatus.

For a better and more complete understanding of the invention, reference should now be had to the following specification and to the accompanying drawing, the single figure of which is a simple, schematic diagram of an embodiment of the invention.

Referring now to the drawing, a length of material 10, such for example as wire, is drawn from a supply means such as the reel 11 and wound in the form of a coil by suitable winding mechanism 12 such as a winding arbor and a coil form mounted thereon. Winding mechanism 12 is driven by suitable driving means, such for example as the electric motor 13, which is supplied from a suitable source of supply which is represented by the two supply lines 14, 15 to which the motor armature and field winding 16 are connected by means of conductors 17, 18 and 19 through a switch 20.

A capstan drum 21 is interposed between the supply reel 11 and the winding mechanism 12. The wire 10 is given several wraps about the capstan drum and then passed about a rider pulley 22 and an idler pulley 23 to the winding mechanism 12.

For the purpose of applying a suitable tension to the wire 10 during the coil winding operation, an electric torque motor 24 is mechanically coupled to the capstan drum 21 and electrically energized from a suitable source of supply such for example as the source 14, 15 to which it is arranged to be connected by means of a switch 25. A torque motor is a motor that is designed to withstand the application of full line voltage under stalled conditions without damage resulting to its winding. Torque motor 24 is provided with a shunt field winding 24a. A characteristic of such a motor as torque motor 24 is that its torque remains substantially constant over a wide range of speeds.

Motor 24 is connected to the source 14, 15 so that its torque opposes the rotation of the capstan drum 21 by wire 10. In other words, torque motor 24 tends to rotate capstan drum 21 in a direction the opposite of that in which it is rotated by the wire 10 as indicated by the arrow 26. Thus when torque motor 24 is energized, a tension is produced in the wire 10 between the capstan drum 21 and the winding mechanism 12.

In order to prevent the wire from slipping on the capstan drum, a slight snubbing tension is applied to the incoming wire to the capstan drum. To provide this snubbing tension, a second torque motor 27 similar in all respects to torque motor 24 is provided. Torque motor 27 is mechanically coupled to the supply reel 11 and is electrically energized from the source 14, 15 so as to produce a torque that opposes the unwinding of the wire 10 from the supply reel 11. As shown, torque motor 27 is provided with a shunt field winding 27a.

In order to vary the tension in the wire between the capstan drum 21 and winding mechanism 12, and the tension in the wire between the supply reel 11 and the capstan drum 21, suitable means are provided for varying the energization of torque motors 24, 27 thereby to vary their torques. These means are illustrated as adjustable resistors 28, 29 respectively connected in the armature circuits of torque motors 24, 27.

Rider pulley 22 is rotatably mounted on a shaft at the end of a lever arm 30 which is pivoted at 31. The right-hand end of lever arm 30 is mechanically connected to the actuating element 32 of a scale mechanism that is provided for the purpose of measuring and indicating the amount of tension in the wire 10 between the capstan drum 21 and winding mechanism 12.

With the foregoing understanding of the apparatus and its organization in the system, the operation of the system itself will readily be understood from the following description:

The torque motors 24, 27 are energized by closing the switch 25, and similarly the motor 13 which drives the winding mechanism 12 is energized by closing the switch 20.

The winding mechanism 12 then draws the wire 10 from the supply reel 11 and winds it to form a coil. The passage of the wire 10 about the capstan drum 21 rotates the drum 21 in the direction of arrow 26.

This rotation of the capstan drum is opposed by the torque of torque motor 24 and thereby a tension is produced in the wire 10 between the capstan drum 21 and the winding mechanism 12, the magnitude of which is indicated upon the scale 33. The resistor 28 is adjusted to vary the energization and torque of the torque motor 24 until the tension in the wire 10 as indicated by the scale 33 is the desired value. Resistor 29 is adjusted until the torque of torque motor 27 produces just sufficient tension in the wire 10 between the supply reel 11 and the capstan drum 21 to prevent the wire from slipping on the capstan drum.

When the adjustments described in the foregoing have been made, the wire 10 is wound on the coil form under a tension that is maintained substantially constant during the entire winding operation. As previously noted, the torque of torque motors 24 and 27 remains substantially constant over a wide range of speeds and consequently the tensions in the wire 10 between the capstan drum 21 and winding mechanism 12 and between supply reel 11 and capstan drum 21 remain substantially constant even though the speed of the wire 10 varies as the diameter of the coil increases.

Although in accordance with the provisions of the Patent Statutes the principle of this invention has been explained together with the best mode in which it is now contemplated applying the principle, it will be understood that the apparatus shown is merely illustrative and that the invention is not limited thereto, since alterations and modifications will readily occur to persons skilled in the art without departing from the true spirit of this invention or from the scope of the annexed claims.

What I claim as new and desire to secure by Letters Patent of the United States is:

1. A control system for winding and reeling apparatus comprising means for winding a length of material to form a coil, a device for supplying material to said winding device, a capstan drum interposed between said supply device and winding device in frictional engagement with said material so as to be driven in one direction by said material, a torque motor mechanically connected to said drum, and electrically energized for rotation in the opposite direction thereby to tension said material, and means for applying a snubbing tension to said material between said supply means and capstan comprising a second torque motor electrically energized for rotation in a direction to oppose the feeding of material from said supply device.

2. A control system for winding and reeling apparatus comprising a supply device containing a length of material, means for drawing material from said supply device, and winding said material to form a coil, a capstan drum about which said material passes to said winding means so as to be rotated by said material, an electric torque motor mechanically coupled to said drum and electrically energized to produce a torque opposing the rotation of said drum thereby to tension the material leaving said drum, and a second torque motor mechanically connected to said supply means and electrically energized to produce a torque opposing the feeding of material from said supply means thereby to tension the incoming material to said drum.

3. A control system for winding and reeling apparatus comprising a supply reel having a length of material wound thereon, a device for drawing material from said supply reel and winding it to form a coil, a capstan drum about which said material passes to said winding means so as to be rotated by said material, means for tensioning the material leaving said drum comprising an electric torque motor mechanically coupled to the drum and electrically energized to produce a torque opposing the rotation of said drum, means for tensioning the incoming material to said drum comprising a second electric torque motor mechanically connected to said reel and electrically energized to oppose the rotation of said reel, and means for varying said tensions comprising means for varying the energization of said torque motors.

4. A control system for winding and reeling apparatus comprising in combination, a supply reel having a length of material wound thereon, a winding arbor, means for driving said arbor to draw material from said reel and to wind it to form a coil, means for applying a tension to said material as it is being wound comprising a capstan drum about which the material passes to said arbor so as to be rotated by said material and an electric torque motor mechanically connected to said drum and electrically energized to produce a torque opposing the rotation of said drum, a second torque motor mechanically connected to said reel and electrically energized to produce a torque opposing the rotation of said reel thereby to apply a snubbing tension to the incoming material to said drum, means for varying the energization of said motors to vary said tensions, and means for measuring and indicating the tension in said material between said drum and said arbor.

HAROLD JAMIESON.